United States Patent [19]

Maistrelli

[11] 4,381,701

[45] May 3, 1983

[54] SERVOMOTOR FEATURING A SERVOVALVE CONTROLLING A HYDRAULIC DRUM MOTOR

[75] Inventor: Roger Maistrelli, Bougival, France

[73] Assignee: Regie Nationale des Usines Renault, Boulogne-Billancourt, France

[21] Appl. No.: 184,267

[22] Filed: Sep. 5, 1980

[30] Foreign Application Priority Data

Sep. 6, 1979 [FR] France ............................ 79 22329

[51] Int. Cl.[3] ...................... F16D 31/02; F01B 13/04

[52] U.S. Cl. ...................................... 91/499; 60/464; 60/468

[58] Field of Search ............................... 91/499-506; 60/464, 468

[56] References Cited

U.S. PATENT DOCUMENTS

| | | | |
|---|---|---|---|
| 2,122,045 | 6/1938 | Rose et al. | 60/464 |
| 3,213,616 | 10/1965 | Roinke | 60/464 |
| 3,360,933 | 1/1968 | Swanson et al. | 60/464 |
| 3,396,536 | 8/1968 | Miller et al. | 60/464 |
| 3,543,514 | 12/1970 | Reimer | 60/468 |
| 3,662,551 | 5/1972 | Denker | 60/468 |
| 3,815,478 | 6/1974 | Akelsson | 91/497 |
| 3,823,650 | 7/1974 | Ring | 91/497 |
| 3,885,389 | 5/1975 | Hull | 60/453 |
| 3,908,518 | 9/1975 | Bobier | 91/506 |
| 3,982,470 | 9/1976 | Adams | 91/506 |

FOREIGN PATENT DOCUMENTS

| | | |
|---|---|---|
| 1342384 | 9/1963 | France . |
| 2271427 | 5/1975 | France . |

*Primary Examiner*—William L. Freeh
*Attorney, Agent, or Firm*—Oblon, Fisher, Spivak, McClelland & Maier

[57] ABSTRACT

A servomotor composed of a servovalve controlling a hydraulic drum motor is disclosed. A housing is enclosed on the side of the inclined cylinder head by a cover serving as a bearing for the motor shaft, and on the side of the distribution ports by an enclosing plate serving as a second bearing for said shaft. The enclosing plate, having an essentially parallelopiped shape, includes two longitudinal boreholes disposed in parallel in a plane parallel to the plane of the plate, with each of said boreholes joining together a borehole perpendicular to the plate and opening into the use opening of the servovalve fastened to one of the surfaces of the plate, and another borehole perpendicular to the plate and opening into one of said distribution ports. The plate also includes at least one transversal borehole joining together the two longitudinal boreholes and containing two-way safety valves or their equivalent.

3 Claims, 5 Drawing Figures

SERVOMOTOR FEATURING A SERVOVALVE CONTROLLING A HYDRAULIC DRUM MOTOR

BACKGROUND OF THE INVENTION

1. Field of the Invention

The present invention concerns hydraulic motors having axial pistons and an inclined cylinder head, also called drum motors.

2. Description of the Prior Art

Motors of this type are well known and, depending on their use, are supplied by various distributors. These take the form of either an "all or nothing" electrovalve or mechanically controlled valve for constant speed motors, or of an output regulator for variable speed motors. With servo movements, it is common to supply the motor through servovalves. On the other hand, protective elements must be combined with these to guard against over-pressure (i.e., safety valves) either in order to protect the motor itself or to limit its torque and protect the mechanism being driven.

When it is necessary to stop a driven inertial load, or to stop a drive load in case of the breakdown of the hydraulic supply system, the motor must be able to function as a pump, and therefore must be capable of being injected with a pressure of several bars by means of one-way injector valves. Furthermore, a shaft must often be available for driving a position, or motor speed, sensor. Finally, such a motor and its accessories must be connected to a hydraulic unit by four cahnnels:

a high pressure servovalve supply channel, a servovalve reservoir return channel, an injector channel and a hydraulic motor drain.

These four channels, and those required between the motor, the servovalve and the valves, make the unit large, heavy and costly. The size and weight are particularly prejudicial in applications where this equipment is packed onto moving machine units, e.g., on production robots.

Integration of valves within the cylinder heads of hydraulic machines is known. Fastening the servovalve directly onto the motor is also known. Lastly, connecting the motor drain to a servovalve return by placing special gaskets on the output shaft of the motor so as to ensure its seal despite the resulting over-pressure in the housing is also known. These improvements enable a reduction in the weight, volume and cost of the assembly, but are generally applied in isolation through the addition of separate elements, so that there exists no very compact complete unit.

SUMMARY OF THE INVENTION

The object of the present invention is to eliminate the preceding disadvantages by producing a hydraulic motor capable of accepting a servovalve, having a receptacle for a position, or shaft speed, sensor, having integrated injector and over-pressure valves, and finally requiring only two connection tubes to the hydraulic generator, with the entire assembly being especially compact.

The invention consists of, within a drum pump housed within an essentially cylindrical housing closed at one end by a cover serving as a bearing for one end of the motor shaft and at the other end by an enclosing plate serving as a bearing for the other end of the shaft, disposing said essentially parallelopiped enclosing plate in such a way that within it lie two longitudinal boreholes located in a plane parallel to that of the plate, communicating, through three boreholes perpendicular to the plate, with the servovalve use openings affixed to said plate, with one of the drum distribution holes, and with the interior of the housing by means of a one-way valve, respectively.

The first of these boreholes perpendicular to both of the longitudinal boreholes preferentially opens onto the two surfaces of the plate, which is finished with two supplementary perpendicular boreholes also opening onto a surface of the plate, so as to enable the servovalve to be connected to either of the surfaces of the plate, with the other surface being used to connect the two connection channels to the hydraulic unit, said connection preferentially being made by means of a connection block which will simultaneously block the unused openings on the corresponding surface of said first perpendicular boreholes.

Finally, the plate comprises one or more transverse boreholes parallel to the plane of the plate, interconnecting the two longitudinal boreholes by means of two safety valves.

BRIEF DESCRIPTION OF THE DRAWINGS

Various other objects, features and attendant advantages of the present invention will be fully appreciated as the same becomes better understood from the following detailed description when considered in connection with the accompanying drawings in which like reference characters designate like or corresponding parts through the several views, and wherein.

DETAILED DESCRIPTION OF THE PREFERRED EMBODIMENTS

Figure 1:
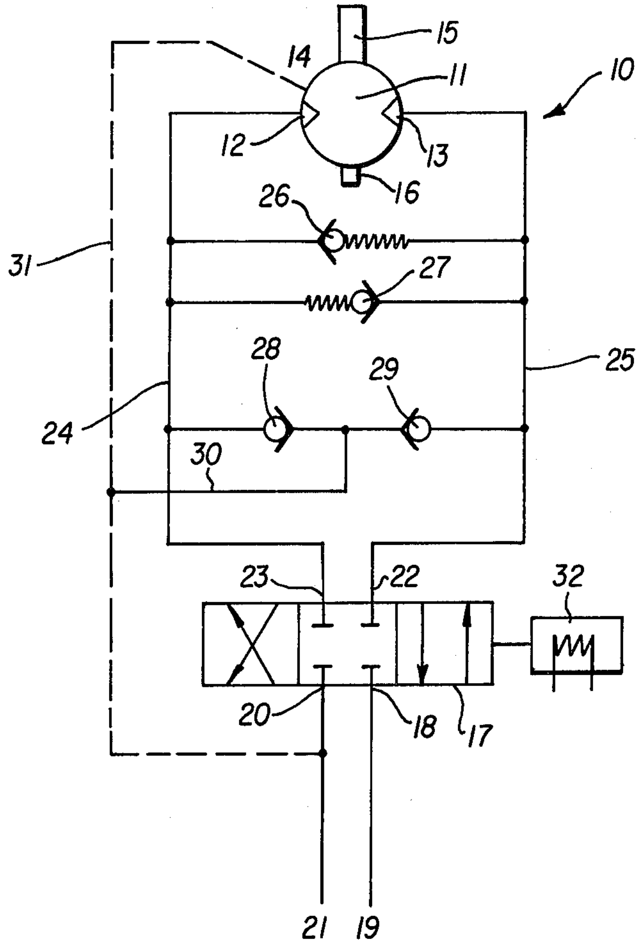
FIG. 1 represents the hydraulic diagram of the motor and its accessories.

In FIG. 1, overall reference 10 designates the servomotor, which consists of the hydraulic motor and its accessories. Said servomotor includes a motor 11 having pistons in a drum and an inclined cylinder head having two openings 12 and 13 for fluid supply and return, and a drain opening 14 for collecting the internal leaks of the motor. The motor has a main output shaft 15 for driving various sensors which are not represented in the Figure.

A servovalve 17, which is itself known, has four openings; opening 18 which is supplied with high pressure fluid through an outer source 19; fluid return opening 20 which is connected to the source or reservoir at a low pressure point 21 regulated by a regulating unit (not shown); and finally openings 22 and 23 constituting the use openings of the servovalve.

Channels 24 and 25 connect the servovalve use openings to motor openings 12 and 13. Two over-pressure valves 26 and 27 limit the pressure difference between channels 24 and 25, whichever contains the higher pressure. Two injector valves 28 and 29 each connect channels 24 and 25 to a channel 30, itself connected to servovalve return opening 20.

Depending on the direction and value of the electric control current of servovalve input unit 32, the latter sends more or less of the high pressure fluid arriving at opening 18 towards use opening 22 or 23, causing the hydraulic motor to turn in one direction or another, with the second use opening (23 or 22) sending the fluid returning from the motor toward low pressure zone 21.

When the pressure difference in channels 24 and 25 tends to rise above the calibrated values of valves 26 and 27, the latter open so that this difference remains limited to the prescribed value through diversion of the necessary quantity of fluid.

When the pressure in channels 24 and 25 tends to drop below the value set by pressure 21, corresponding injector valve 28 or 29 opens so as to maintain this low pressure.

Figure 2:
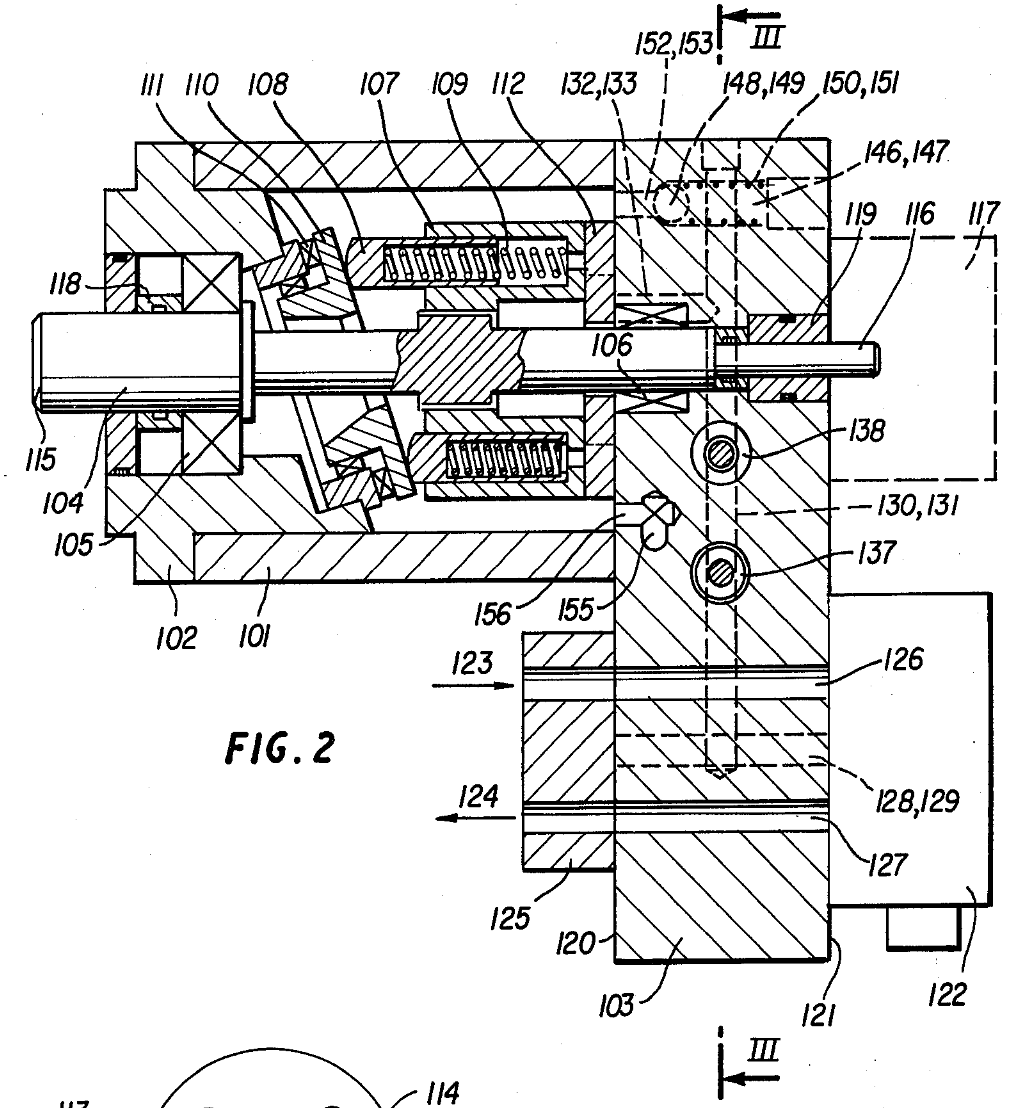
FIG. 2 is an axial cross section of the device along line II—II of FIG. 3.
Figure 3:
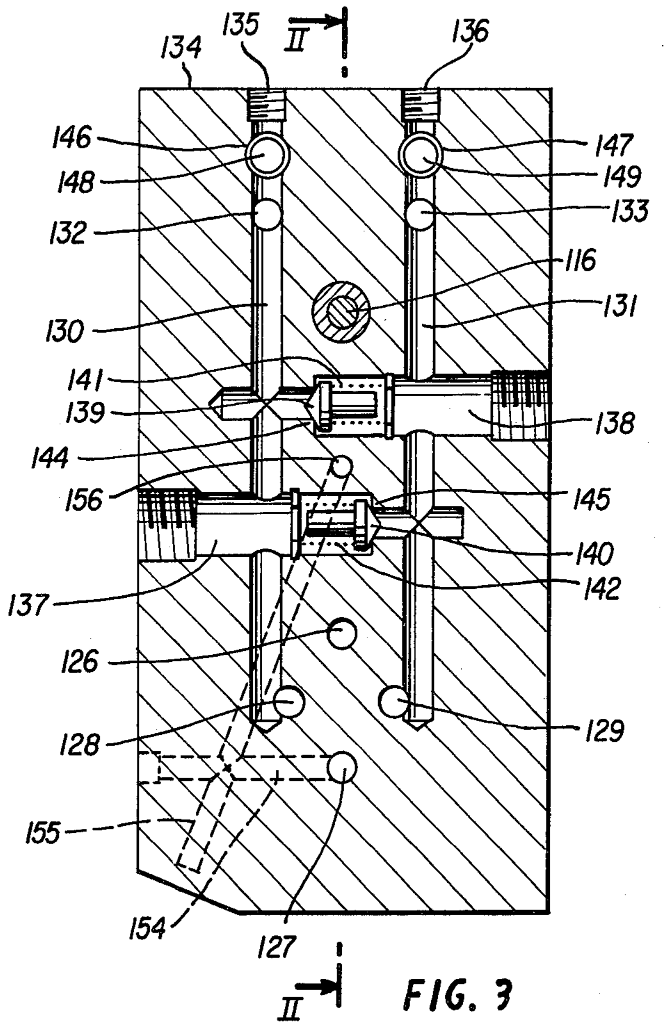
FIG. 3 is a transverse cross-section along line III—III of FIG. 2.
Figure 5:
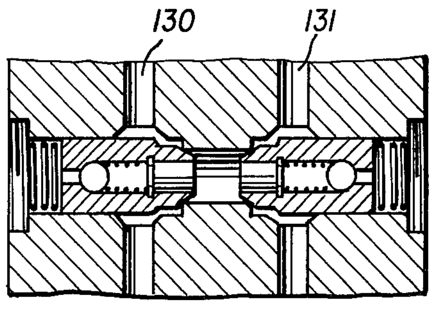
FIG. 5 is a fragmentary cross-section analogous to FIG. 3 of a variant embodiment of the safety valves.

It can be further seen in FIGS. 2 and 3 that the actual motor consists of a generally tube-shaped main housing 101, enclosed by a cover 102 and a plate 103. A shaft 104 turning within bearings 105 and 106 housed in the cover and the plate, rotates integrally with a drum 107, within which slide pistons 108 driven by springs 109 against an inclined cylinder head 110.

Figure 4:
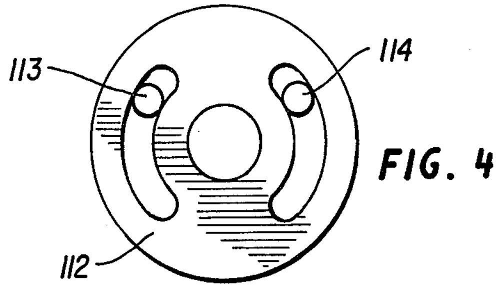
FIG. 4 is a partial front view of the distributor plate.

Cylinder head 110 is mounted so as to turn freely within cover 102 by virtue of axial and radial bearings 111. The drum slides against a stationary distribution plate 112 having two openings 113 and 114, visible in FIG. 4, which ensure the supply of oil to the piston cylinders in a known fashion.

Shaft 104 has a thick end 115 on the side of cover 102 for driving a load, and a thinner end 116 for driving a position or speed sensor, depending on the application. This optional sensor is represented by broken lines in FIG. 2 and is designated by reference 117. Gaskets 118 and 119 seal the shaft outlets.

The assembly which has been described above is entirely known, and the invention lies in the construction of plate 103.

Plate 103, having a generally parallelopiped shape, comprises a surface 120 for fastening onto the central motor housing, and an opposite surface 121, possibly accepting sensor 117. One of these two surfaces, 121 in the example shown, receives control servovalve 122 (the equivalent of assembly 17, 32 of FIG. 1), with the other surface receiving the two high and low pressure channels 123 and 124 linking the plate with an outside hydraulic generator. Said channels 123 and 124, which correspond to 19 and 21 in FIG. 1, may be directly connected to surface 120 or, as shown in FIg. 2, may be connected by means of a connection block 125 screwed onto plate 103, which facilitates maintenance operations by eliminating the necessity of unscrewing the hydraulic connections in order to disassemble the motor.

Plate 103 includes a borehole 126 linking channel 123 with the servovalve high pressure supply opening, a borehole 127 linking channel 124 for returning fluid to the low pressure zone of the outside hydraulic generator with the servovalve return opening, and boreholes 128 and 129 disposed in such a way that they communicate with the two use openings of the servovalve.

Boreholes 128 and 129 are linked with distributor plate openings 113 and 114 through two longitudinal boreholes 130 and 131 located in a plane parallel to that of the plate and two perpendicular boreholes 132 and 133. The sets of boreholes 128, 130 and 132, on the one hand, and 129, 131 and 133, on the other, are equivalent to channels 24 and 25 of FIG. 1, respectively. Channels 130 and 131, which open onto surface 134 of plate 103, must be closed by plugs 135 and 136, although said plugs are preferentially removable in order to serve as sites for measuring the pressure of the servovalve during breakdowns. Boreholes 128 and 129 preferentially open onto the two surfaces of the plate so as to enable servovalve 122 to be mounted equally onto one or the other of these surfaces, as set forth above. In this case, they must be on the side to which channels 123 and 124 lead. This is automatically obtained when a connection block 125 is used.

Valves 139 and 140 biased against seats 144 and 145 in bores 137 and 138 by springs 141 and 142 correspond to over-pressure valves 26 and 27 of FIG. 1.

Plate 103 further contains two boreholes 146 and 147, of which the portion having the small diameter communicates with boreholes 130 and 131 and houses injector valves shown in the form of a ball 148 or 149 driven by a spring 150 or 151 against seat 152 or 153, which may be inserted or cut during the machining of boreholes 146 and 147. These valves, which are equivalent to valves 28 and 29 of FIG. 1, may also be produced in other forms, e.g., as flat or conical valves. Simultaneously, auxiliary boreholes 154, 155 and 156 link the interior of housing 101 with return opening 127, such assembly being equivalent to channel 31 of FIG. 1. Finally, plate 103 includes various fastening elements (not shown) for fastening sensor 117 and servovalve 122 onto the housing.

The arrangement described above, which enables the operations mentioned in the diagram of FIG. 1 to be produced, has the following advantages:

The various safety functions and the connection channels are organized in plate 103, which further serves to fasten the servovalve and the sensor, yielding a particularly compact servomotor.

The arrangement allows a free choice between positioning the servovalve on surface 120 or 121.

Machining is simple since all of the connection or valve housing boreholes are cut perpendicularly through longitudinal boreholes 130 and 131.

Connections with the hydraulic generator are made through only two channels instead of three or four, as with conventional equipment, which reduces the cost of use.

Installation of pressure gauges for maintenance purposes is quick and simple.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A servomotor comprising:
- a housing having an axis;
- a cover on one axial end of said housing;
- a substantially parallelopiped enclosing plate on the other axial end of said housing;
- cylinder head means in said housing and having a surface inclined to said axis;
- a motor shaft journalled in said cover and said enclosing plate;
- a drum rotating on said motor shaft and including two pistons slidable in said drum and biased against said surface of said cylinder head;
- a distribution port in said enclosing plate for each said piston;

a servovalve having supply and use openings on a first surface thereof, said first surface being in fixed fluid tight contact with one surface of said enclosing plate;

first axial bore means in said cover plate for each said piston, each said first bore means communicating with each said distribution port;

second axial bore means in said cover plate for each said first axial bore means, each said second bore means having one end extending to said one surface of said enclosing plate for communicating with said use openings of said servovalve;

third bore means extending perpendicular to said first and second bore means and communicating each said first bore means with a corresponding second bore means;

two transverse bore means connecting each of said third bore means;

two way safety valve means in said at least one transverse bore, wherein said enclosing plate further comprises two fourth bore means having one end extending to said one surface of said enclosing plate for communicating said servovalve supply openings with two outside connection channels joined respectively to a high pressure source and a non-zero low pressure source, said connection being effected by means of a connection block applied onto a second surface of said plate, the other end of said fourth bore means extending to said second surface of said plate.

2. The servomotor of claim 1, further comprising:

fifth axial bore means in said cover plate for each said third bore means, each said fifth bore means communicating said motor housing with one of said third bore means;

one way, spring biased injector valve means in each said fifth axial bore means; and sixth bore means in said cover plate and connecting the interior of said housing with the one of said fourth bore means communicating with said low pressure source for drainage of said motor.

3. The servomotor of claim 1 or 2 wherein each said second axial bore means extends onto two opposing surfaces of said cover plate, whereby said servovalve may be positioned on either of said opposing surfaces to cover said second bore means.

* * * * *